US010511891B2

(12) United States Patent
Tang et al.

(10) Patent No.: US 10,511,891 B2
(45) Date of Patent: Dec. 17, 2019

(54) VIDEO PLAYBACK IN GROUP COMMUNICATIONS

(71) Applicant: Google Inc., Mountain View, CA (US)

(72) Inventors: Annie Tang, San Francisco, CA (US); Benoît de Boursetty, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 62 days.

(21) Appl. No.: 15/717,273

(22) Filed: Sep. 27, 2017

(65) Prior Publication Data
US 2018/0146254 A1 May 24, 2018

Related U.S. Application Data

(60) Provisional application No. 62/424,940, filed on Nov. 21, 2016.

(51) Int. Cl.
*H04N 21/4788* (2011.01)
*G06F 3/0488* (2013.01)
(Continued)

(52) U.S. Cl.
CPC ....... *H04N 21/4788* (2013.01); *G06F 3/0485* (2013.01); *G06F 3/0488* (2013.01);
(Continued)

(58) Field of Classification Search
CPC . H04N 21/4788; G06F 3/0485; G06F 3/0488; G06F 3/04883; G06Q 10/107
(Continued)

(56) References Cited

U.S. PATENT DOCUMENTS

2005/0132288 A1 6/2005 Kirn et al.
2008/0055269 A1* 3/2008 Lemay ................. G06F 3/0482
345/173
(Continued)

OTHER PUBLICATIONS

"Creating a Sometimes-Fixed-Position Element With jQuery"; Ben Nadel; <https://www.bennadel.com/blog/1810-creating-a-sometimes-fixed-position-element-with-jquery.htm>; published Jan. 12, 2010 (Year: 2010).*

(Continued)

*Primary Examiner* — Stephen S Hong
*Assistant Examiner* — Broderick C Anderson
(74) *Attorney, Agent, or Firm* — Lowenstein Sandler LLP (57) ABSTRACT

Aspects of the disclosure describe video playback in group communications. A method includes receiving a request for a video from a messaging application providing a group communication comprising messages, instructing a first client device to display a graphical representation of a video in a user interface (UI) of the messaging application, the first client device associated with a first user participating in the group communication with other users, receiving first user input comprising a selection of the graphical representation of the video in the UI during the group communication, responsive to the first user input, initiating playback of the video in a video playback portion of the UI, allowing input, via the UI, of other messages for the group communication during playback of the video, and maintaining the video playback portion of the UI visible to the first user while the first user scrolls through the messages of the group communication.

20 Claims, 7 Drawing Sheets

(51) Int. Cl.
*G06F 3/0485* (2013.01)
*H04L 12/58* (2006.01)
*H04N 21/472* (2011.01)
*G06Q 10/10* (2012.01)
*H04N 21/2743* (2011.01)
*H04N 21/414* (2011.01)

(52) U.S. Cl.
CPC ....... *G06F 3/04883* (2013.01); *G06Q 10/107* (2013.01); *H04L 51/046* (2013.01); *H04N 21/2743* (2013.01); *H04N 21/41407* (2013.01); *H04N 21/47202* (2013.01); *H04L 51/32* (2013.01)

(58) Field of Classification Search
USPC ........................................................ 715/719
See application file for complete search history.

(56) References Cited

U.S. PATENT DOCUMENTS

| | | | |
|---|---|---|---|
| 2008/0059580 A1 | 3/2008 | Kalinowski et al. | |
| 2008/0174570 A1* | 7/2008 | Jobs | G06F 3/0488 345/173 |
| 2009/0030794 A1* | 1/2009 | Scheflan | G06Q 30/02 705/14.39 |
| 2010/0037138 A1* | 2/2010 | Shcherbakov | H04N 21/4143 715/716 |
| 2010/0162138 A1* | 6/2010 | Pascal | G06Q 10/107 715/758 |
| 2012/0182384 A1 | 7/2012 | Anderson et al. | |
| 2013/0174082 A1 | 7/2013 | Khandker et al. | |
| 2014/0136990 A1* | 5/2014 | Gonnen | H04L 51/18 715/752 |

OTHER PUBLICATIONS

Jonathan Savage; BoldContentVideo; <https://boldcontentvideo.com/2015/12/17/the-pros-and-cons-of-using-sticky-videos-for-video-marketing/>; Published Dec. 17, 2015 (Year: 2015).*

"Implementing video playback in a scrolled list (ListView & RecyclerView)"; Danylo Volokh; <https://medium.com/@v.danylo/implementing-video-playback-in-a-scrolled-list-listview-recyclerview-d04bc2148429>; published Jan. 22, 2016 (Year: 2016).*

PCT Notification of Transmittal of the International Search Report and the Written Opinion of the International Searching Authority for PCT Application No. PCT/US2017/054140, dated Dec. 22, 2017, 10 pages.

* cited by examiner

VIDEO PLAYBACK IN GROUP COMMUNICATIONS

CROSS-REFERENCE TO RELATED APPLICATIONS

This application claims the benefit of priority from U.S. Provisional Application No. 62/424,940, filed on Nov. 21, 2016, which is herein incorporated by reference.

TECHNICAL FIELD

The present disclosure relates to user-to-user communication services, such as group messaging or commenting, and in particular, to video playback in group communications.

BACKGROUND

A group communication on a content sharing service provides a forum for a user to share messages and videos with other participants. Currently, when a video is shared in a group communication, a user cannot simultaneously watch a video and chat about the video. Instead, the user performs complex switching maneuvers in order to transition between video-watching and discussion of the video. For example, the user may have to switch applications or switch modes. This can be a technically challenging, cumbersome and time-intensive process (especially for mobile device users) that may discourage users from sharing videos when participating in group communication.

SUMMARY

Aspects and implementations of the disclosure improve user-to-user communication, such as group messaging or commenting, by providing video playback in group communication using various display states for shared videos in the group communication. In some implementations, a server receives a request for a video from a messaging application providing a group communication comprising messages. The server may then instruct a first client device to display a graphical representation of a video in a user interface (UI) of the messaging application during the group communication on the first client device. In one implementation, the first client device is associated with a first user participating in the group communication with other users of a content sharing service.

Further, the server may receive, from the first client device, first user input including a selection of the graphical representation of the video in the UI during the group communication. In addition, the server may, responsive to the first user input, initiate playback of the video in a video playback portion of the UI. The server may allow input, via the UI, of other messages for the group communication during playback of the video. The server may also maintain the video playback portion of the UI visible to the first user while the first user scrolls through the messages of the group communication.

In some implementations, a mobile device of a first user presents, a graphical user interface (GUI) of a messaging application providing group communication between a first user and one or more other users in a group. The GUI may include a portion to display messages shared by at least one of the first user or the one or more other users in the group communication. In one implementation, at least one of the messages includes a graphical representation of a video shared in the group communication. The mobile device may further receive, via the GUI during the group communication, a selection of the graphical representation of the video.

In addition, the mobile device may, responsive to the selection of the video, provide playback of the video in a video playback portion of the UI. Further, the mobile device may receive, via the GUI, input of one or more other messages for the group communication during the playback of the video. The mobile device may also maintain the video playback portion of the UI visible to the first user while the first user scrolls through the messages of the group communication.

BRIEF DESCRIPTION OF THE DRAWINGS

The disclosed embodiments have other advantages and features that are more readily apparent from the detailed description and the accompanying figures. A brief introduction of the figures is below.

DETAILED DESCRIPTION

The disclosure relates to user-to-user group communication, such as group messaging or commenting. Currently, when a video is shared in a group communication, a user cannot simultaneously watch a video and chat about the video. Instead, the user performs complex switching maneuvers in order to transition between video-watching and discussion of the video. For example, the user may have to switch applications or switch modes. This can be a technically challenging, cumbersome and time-intensive process (especially for mobile device users) that may discourage users from sharing videos when participating in group communication.

Aspects of the disclosure address the above and other deficiencies by providing video playback in a messaging application during group communication using transitions between various display states for shared videos in the group communication. The display states of the shared video may be implemented within a UI of the messaging application during the group communication. The various display states enable concurrent viewing of the video and participation in the group communication via the messaging application. The display states of a video shared in the group communication can include a collapsed state, an inline expansion state, and a persistent state.

The collapsed state includes a static or animated selectable graphical representation element (e.g., thumbnail) of the video within the UI of the group communication. The inline expansion state includes an expanded video playback portion (may also be referred to herein as a "mini-player") providing playback and playback controls for the video, where the mini-player scrolls with the conversation in the UI of the group communication. The persistent state includes maintaining the mini-player at a fixed location (e.g., top, bottom, etc.) of the UI of the group communication while simultaneously allowing messages of the group communication to continue scrolling up or down below the video within the UI. In some implementations, the persistent state may also be referred to as a "sticky" state.

Providing the above-described display states for the shared video within the UI of a group communication addresses a number of constraints in conventional group communication systems. For example, during the group communication, a user is able to scroll to the bottom of a conversation in the UI of the group communication without interrupting playback of the shared video, in order to see a context in which the user may reply. The user is also able to pause the shared video without losing an ability to resume the shared video immediately. In addition, the user can dismiss the shared video back into the collapsed state in order to regain space in the UI of the group communication.

As a result, the technology of providing video playback in group communications is improved by providing various display states for a shared video within a UI of a messaging application during a group communication, where the various display states enable concurrent viewing of the video and participation in the group communication via the messaging application. This is especially advantageous for mobile device environments, where viewing a shared video and discussing the same shared video no longer requires opening a different mobile application or providing multiple inputs to switch between different screens of a mobile application, thereby replacing a conventional process that is inconvenient and time-consuming due to a limited screen size and a small keyboard.

Figure 1:
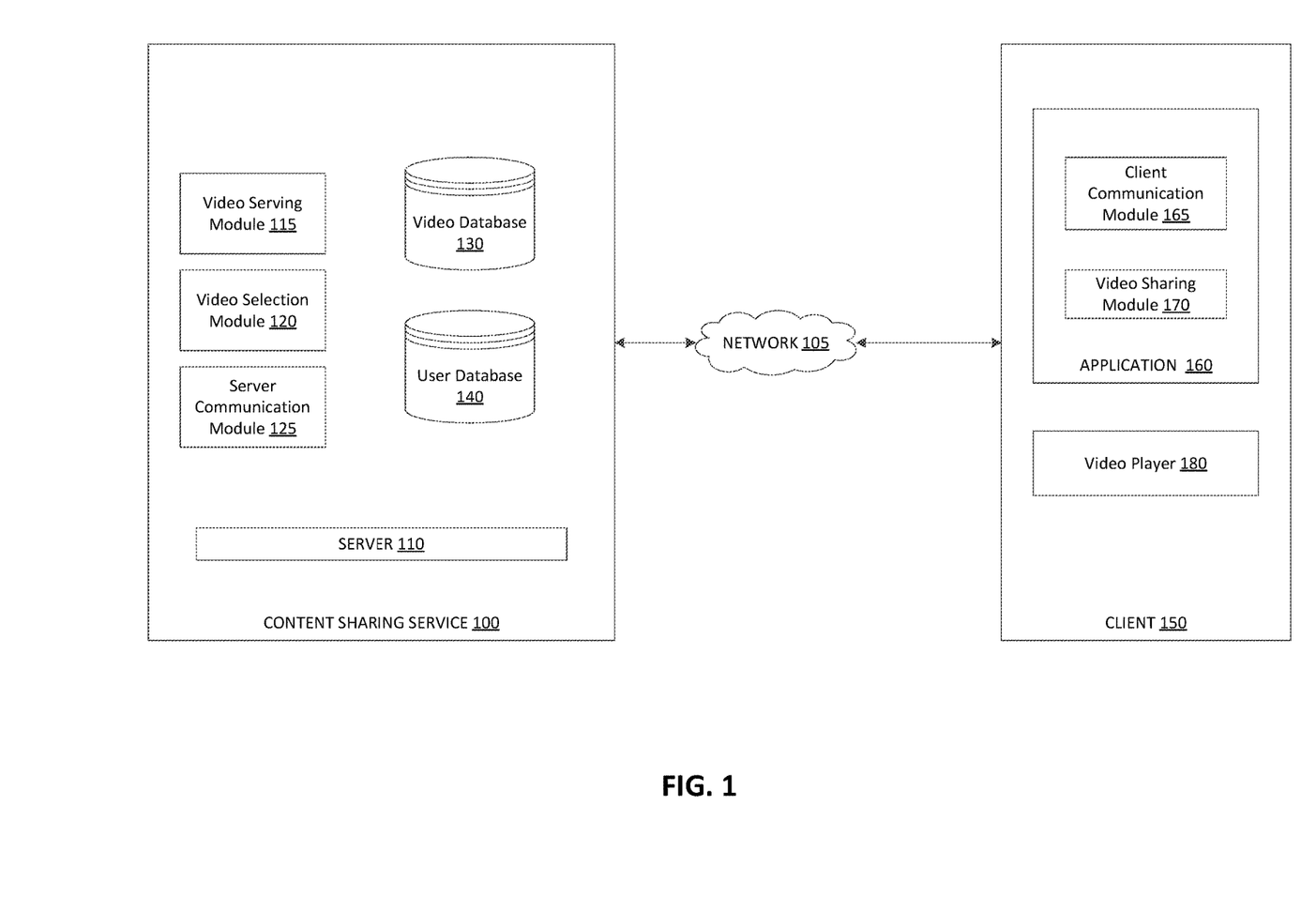
FIG. 1 is a block diagram illustrating a system architecture for video playback in a group communication, according to an implementation.

FIG. 1 is a block diagram illustrating a system architecture of an embodiment of a content sharing service 100. Examples of content sharing services are video services, social messaging services, multi-media messaging services, gaming services, music sharing services, and photo sharing services. The system is scalable to accommodate multiple users that use clients 150 to interact with the content sharing service 100. While only one client 150 is shown, it is understood that very large numbers (e.g., millions) of clients 150 are supported and can be in communication with the content sharing service 100 at any time.

The client 150 includes the content sharing application 160 downloaded through the network 105, which is typically the Internet, but can also be any network, including but not limited to any combination of a local area network (LAN), a metropolitan area network (MAN), a wide area network (WAN), a mobile, wired, or wireless network, a private network, or a virtual private network. In another embodiment, the content sharing application 160 is pre-loaded on the client 150 such that the user of the client 150 does not have to download the content sharing application 160. The client 150 uses the content sharing application 160 to interact with digital content items (e.g., video files, audio files, photos, etc.) and can connect to the server 110 of the content sharing service 100 via the network 105. The client 150 may include a variety of different computing devices. Examples of clients 150 can include personal computers, digital assistants, personal digital assistants, cellular phones, mobile phones, smart phones, laptop computers, etc.

Examples of content sharing application 160 are video sharing applications, social messaging applications, multi-media applications, gaming applications, and music sharing applications, and photo sharing applications. The content sharing application 155 allows for group communication and can include a client communication module 165 and a video sharing module 170. Group communication refers to exchange of messages between multiple members of a group, where the messages are included in a thread (e.g., a chronological stream of posts) visible to the members of the group, and can be, for example, part of a public or private group chat or a public or private comment thread. The messages may include different types of content, including, for example, textual content, images, audio and/or video content, etc.

The client communication module 165 allows the user of the client 150 to participate in group communications through the content sharing application 155 by transmitting messages from the user to other users in the group communication and receiving messages from the other users in the group communication. Examples of technologies for implementing the group communication can include Short Message Service (SMS), Enhanced Message Service (EMS), Multimedia Message Service (MMS), instant messaging, social messaging, and email.

The video sharing module 170 facilitates video sharing in the group communication by transmitting video identifiers of videos selected by one or more users to other users of the group communication and receiving video identifiers of videos shared by other users of the group communication. In some embodiments, the video identifiers comprise sound files, images, and/or other kinds of media, or Uniform Resource Locators (URLs) or Uniform Resource Identifiers (URIs) that point to the locations of such media.

The client 150 also includes a video player 180 that is used for playing a video, such as a video stream or a video file. The video player 180 can be a standalone application, or a plug-in to another application such as a network browser. In one embodiment, the video player 180 is embedded in the content sharing application 160. The video player 180 includes a user interface (UI) and UI controls (and corresponding application programming interfaces) for performing actions pertaining to a video, such as, selecting a video, controlling playback of a video (e.g., starting, stopping, pausing, forwarding, and rewinding a video), evaluating a video, sharing a video, commenting on a video. The video player 180 can include in its user interface a video display format selection configured to indicate the applicable video display format (e.g., a two-dimensional (2D) video or a three-dimensional (3D) video). Other types of user interface controls (e.g., buttons, keyboard controls) can be used as well to control the playback and video format selection functionality of the video player 180.

The content sharing service 100 can be a web server that hosts and/or serves video content items ("videos"). Alternatively, the content sharing service 100 can be a server for mobile applications ("apps"), a gaming system server, or the like. Specific examples below that describe the content sharing service 100 in a particular implementation such as a web server are not intended to limit the scope of the described disclosure to that particular embodiment, but rather to provide examples and context for the associated description.

As shown in FIG. 1, the content sharing service (also referred to herein as a content sharing platform) 100 can include a server 110, a video serving module 115, a video selection module 120, a server communication module 125, a video data store (e.g., video database) 130, and a user database 140. In one embodiment, the server communication module 125 is independent of the content sharing service 100. Additionally or alternatively, the server communication module 120 communicates with a third party messaging platform, such as a messaging application on a smartphone. In still other embodiments, the video serving module 115, the video selection module 125, the server communication module 125, the video database 130, and the user database 140 are part of the server 110.

Many additional features, such as firewalls, load balancers, application servers, failover servers, site management tools and so forth are not shown so as not to obscure the features of the system. It will be understood that the term "website" represents any computer system adapted to serve content using any internetworking protocols, and is not intended to be limited to content uploaded or downloaded via the Internet or the HyperText Transfer Protocol (HTTP). In general, functions described in one embodiment as being performed on the server side can also be performed on the client side in other embodiments if appropriate. In addition, the functionality attributed to a particular component can be performed by different or multiple components operating together.

A server as referred to herein can be implemented as a server program executing on a server-class computer comprising a central processing unit (CPU), memory, network interface, peripheral interfaces, and other well-known components. The computers themselves preferably run an operating system such as LINUX, have generally high performance CPUs, several gigabytes of memory, and gigabytes, terabytes, or even petabytes of disk storage. Of course, other types of computers can be used, and it is expected that as more powerful computers are developed in the future, they can be configured in accordance with the teachings here. The functionality implemented by any of the elements can be provided from computer program products that are stored in tangible computer readable storage media (random access memory (RAM), hard disk, optical/magnetic media, etc.).

As previously described, a user of the client 150 uses the content sharing application 160 to connect to the server 110 to play videos and interact with other content items (e.g., audio files, images, etc.) that have been provided by content providers. Users of the client 150 can search for videos based on keywords or other metadata. These requests are received as queries by the server 110 and provided to the video serving module 115, which is responsible for searching the video data store (e.g., database 130) for videos that satisfy the user queries, and providing the videos to the users. The video serving module 115 supports searching on any characteristics of a video, including its title, description, metadata, author, category, and so forth. Alternatively, users can browse videos based on categories such as most viewed videos, sports, animals, or automobiles. For example, the user can browse videos related to cars and select which videos to watch. In some embodiments, the user can search for or browse suggested or trending videos, as determined by the content sharing service 100. Users can also access videos via autoplay or by clicking an advertisement displayed on the user interface of the content sharing service 100. Other methods for searching for and locating videos via video serving module 115 may also be employed at the discretion of the implementer.

The video selection module 120 allows a user using the client 150 to share a video with other users in a group communication. The video selection module 120 provides a direct entry point for the content sharing application 160 within the communication that allows a user to select and share a video with other users directly, without having to leave the content sharing application 160 or without having to provide multiple inputs to switch between different screens of an application. In some embodiments, this direct entry point includes a video selection control (also referred to herein as a video sharing GUI element) in the group communication interface, selection of which causes the content sharing application 160 to display a video selection interface.

As discussed above, the client communication module 165 displays the group communication to the client 150 and sends instructions to the video player 180 to display videos shared in the group communication in various modes responsive to user actions. The client communication module 165 allows the user of the client 150 to participate in group communications through the application 160 by transmitting replies from the user to the group communication and receiving replies from other users in the group communication.

Implementations of the disclosure provide various display states for videos in a group communication, where the display states of the video allow users to watch a shared video within a UI of the group communication while maintaining the ability to continue discussions in the group communication. The display states of a video shared in the group communication include a collapsed state, an inline expansion state, and a persistent state. The client communication module 165 is responsible for scrolling the conversation in the group communication, displaying thumbnails, directing the video player 180 to enter or leave the various display states for a shared video in the group communication, and interpreting user gestures (e.g., touch gestures or gestures received via other input devices, such as a mouse or keyboard) responsible for scrolling. The video sharing module 170 facilitates video sharing in the group communication by transmitting videos selected by the user to the group communication and receiving videos shared by other users of the group communication. The video player 180 is responsible for entering and leaving the various display states for a shared video in the group communication when instructed by the client communication module 165.

By default, videos shared in the group communication are displayed in the UI of the group communication in a collapsed state. When a user of the client 150 shares a video, the server communication module 120 instructs the client communication module 165 to display the video in the collapsed state in a UI of the group communication. In one implementation, the collapsed state includes displaying the video as a thumbnail. A thumbnail may refer to a reduced-size version of the video representing by an image that is used to help recognize the video. The thumbnail may be static or animated.

Figure 2:
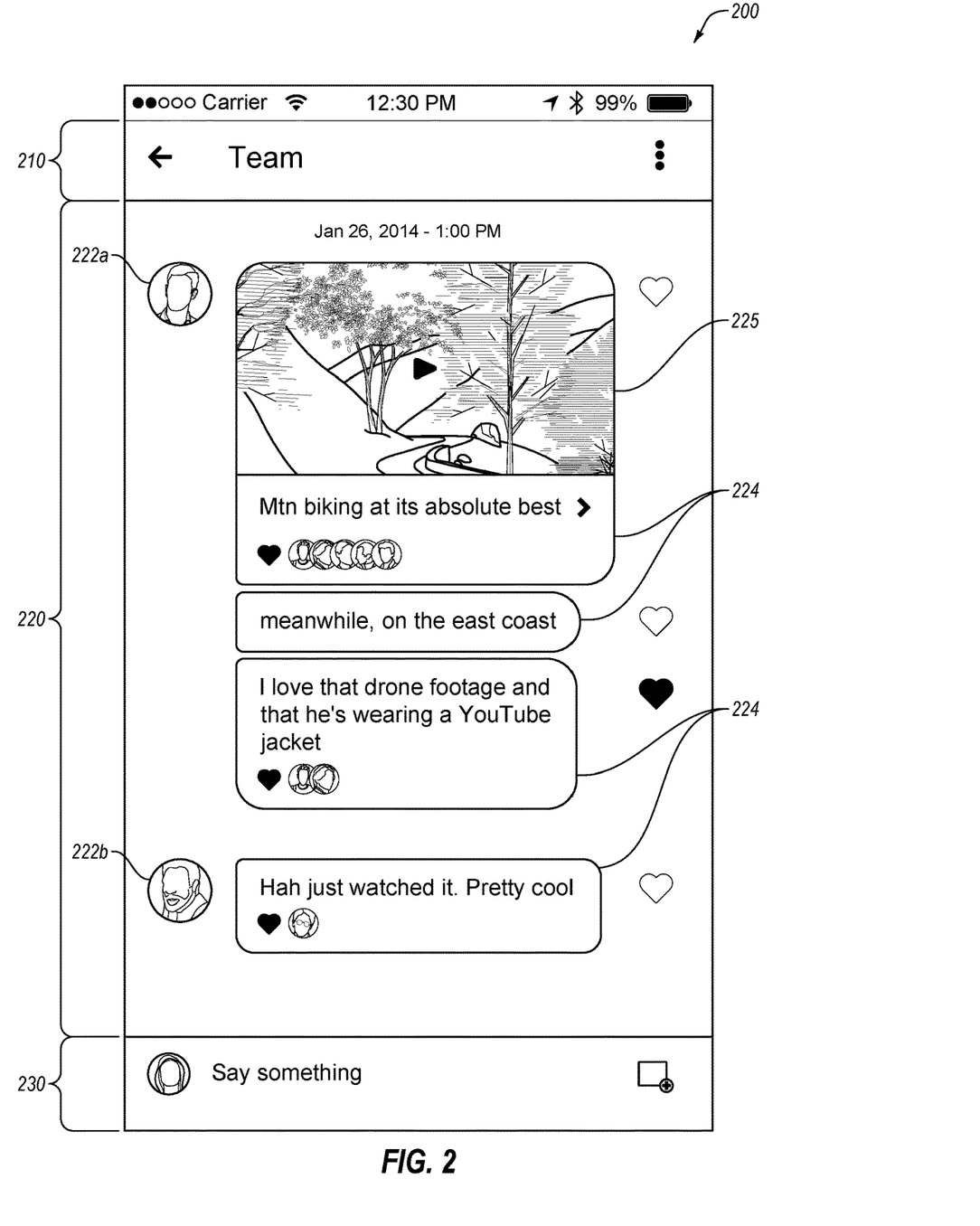
FIG. 2 illustrates an example group communication interface in which a video is shared in a collapsed state, according to an implementation.

FIG. 2 illustrates an example of a group communication interface 200 in which a video is shared in a collapsed state in a group communication, according to some implementations. Other users in the group communication can play the video, write a reply to the video, or select another video for sharing in the group communication.

The group communication interface 200 includes a group communication identifier (ID) header 210, a conversation portion 220, and a message input portion 230. The group communication ID header 210 may include a title or other identification of the group communication, The conversation portion 220 may include one or more messages 224 provided by one or more client devices participating in the group communication. User avatars 222a, 222b may be shown in the conversation portion 220 to identify user(s) the contributed a particular message 224 to the group communication. While the identifiers 222a, 222b of only two other users participating in the group communication are displayed on the group communication interface 200, the group communication can contain large numbers of users of the content sharing service. The message input portion 230 may enable a user to input a message to contribute to the group communication.

In the example in FIG. 2, a shared video is provided within the group communication interface 200 in a collapsed state. As such, a selectable thumbnail 225 of the video is provided as one of the messages 224 of the group communication. In the collapsed state, the selectable thumbnail can be scrolled up or down along with the other messages 224 of the group communication via scroll up or scroll down gestures (e.g., swipe up or swipe down).

Referring back to FIG. 1, when a user of the client 150 selects the shared video (e.g., by tapping the thumbnail), the server communication module 120 sends an instruction to the client communication module 165 to expand the thumbnail into an inline expansion state. In the inline expansion state, the shared video is presented in a larger size (as compared to the collapsed state of the video (e.g., thumbnail)) and also is presented with playback controls. The video in the inline expansion state scrolls along with the other messages (also referred to herein as the "conversation") in the group communication. In one implementation, when the video initially enters the inline expansion state, the video may automatically begin playback ("autoplay") within the UI of the group communication. Furthermore, playback controls are provided with the video as part of the inline expansion state, where the playback controls allow the video to be paused or re-started, for example, without collapsing the video.

Figure 3:
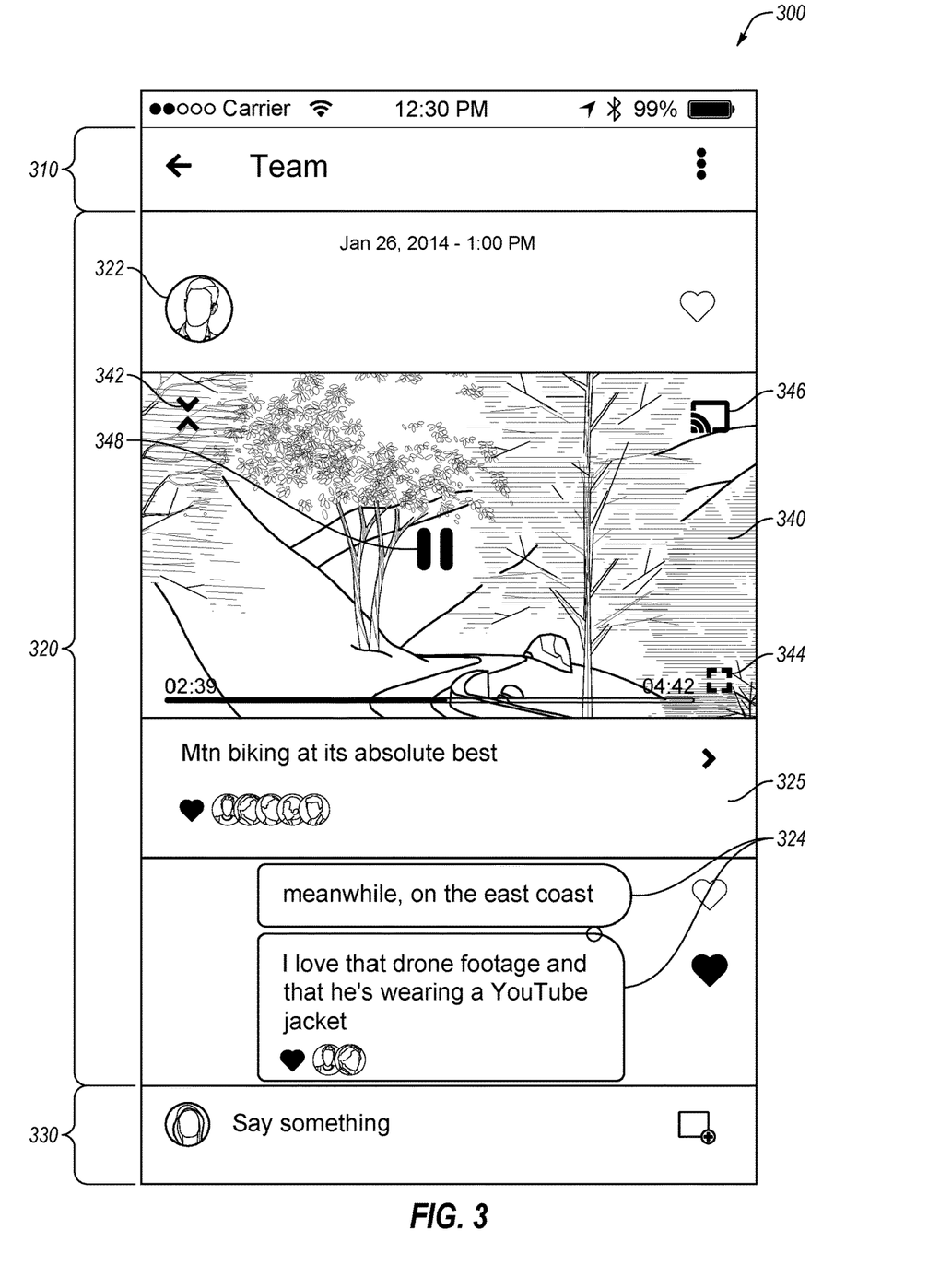
FIG. 3 illustrates an example group communication interface in which a video is shared in an inline expansion state, according to an implementation.

FIG. 3 illustrates an example of a group communication interface 300 in which a video is shared in an inline expansion state in a group communication, according to some implementations. The group communication interface 300 reflects a same example group communication depicted in group communication interface 200 of FIG. 2. As such, the group communication interface 300 includes a group communication ID header 310, a conversation portion 320, and a message input portion 330, which operate similar to the identically-named counterparts described with respect to group communication interface 200 of FIG. 2. Similar to FIG. 2, the conversation portion 320 may include one or more messages 324 provided by one or more client devices participating in the group communication. User avatars 322 may be shown in the conversation portion 320 to identify user(s) the contributed a particular message 324 to the group communication.

In the example in FIG. 3, a selection (e.g., tap gesture) of the thumbnail 225 of the shared video of group communication interface 200 is detected. As a result of the detected selection, the shared video of FIG. 2 is provided within the group communication interface 300 in an inline expansion state. As such, the particular message 325 including the shared video is expanded to a "mini-player" 340 within the group communication interface 300. The mini-player 240 can provide playback of the video (e.g., autoplay) as well as playback controls for the video, including a pause element 348 to cause playback of the video to be paused without collapsing or exiting the mini-player 340. The mini-player 340 may also include a collapse element 342, an expansion element 344, and a connected streaming element 346. In the inline expansion state, the mini-player 340 scrolls up or down along with the other messages 334 in the group communication interface 300 responsive to scroll up or down gestures (e.g., swipe up or swipe down).

Referring back to FIG. 1, if the video (while in the inline expansion state) is not fully in view on the UI of the group communication, the client communication module 165 may automatically (i.e., without user intervention) scrolls the conversation until the video is vertically centered in the UI of the group communication (e.g., on the display of the client 150). If there is not enough conversation "runway" for the video to make it to the center of the UI (e.g., if the video is the last event in the conversation), then the conversation is scrolled forward as far as it can be. If a selection (e.g., tap; selection of collapse element 342 of FIG. 3) of the video is detected while the video is in the inline expansion state, the client communication module 165 sends an instruction to the video player 180 to stop playback of the video and collapses the video back to the collapsed state (e.g., into the thumbnail). Alternatively, if the shared video in the inline expansion state is scrolled out of view at the bottom of the UI, the client communication module 165 instructs the video player 180 to stop playback of the video. Additionally, if a swipe up or swipe down gesture is detected with respect to the video portion of the UI when the video is in the inline expansion state, the client communication module 165 instructs the video player 180 to scroll the conversation.

In one embodiment, when a video in the inline expansion state is scrolled to the top of the display, the client communication module 165 instructs the video playback module 160 to enter a persistent state. In the persistent state, the shared video maintains a position (e.g., persistent) at a fixed portion (e.g., top, bottom, sides, etc.) of the UI of the group communication, while the conversation continues to scroll separate from the video. In some implementations, a drop-shadow is shown immediately behind, below, and/or underneath the video to indicate that the video is in the persistent state. If a swipe down gesture is detected on the video portion of the UI while the video is in the persistent state, the client communication module 165 instructs the video player 180 to collapse the video and the client communication module 165 displays the thumbnail. On the other hand, a swipe up gesture on the video portion of the UI may not trigger an action.

Figure 4:
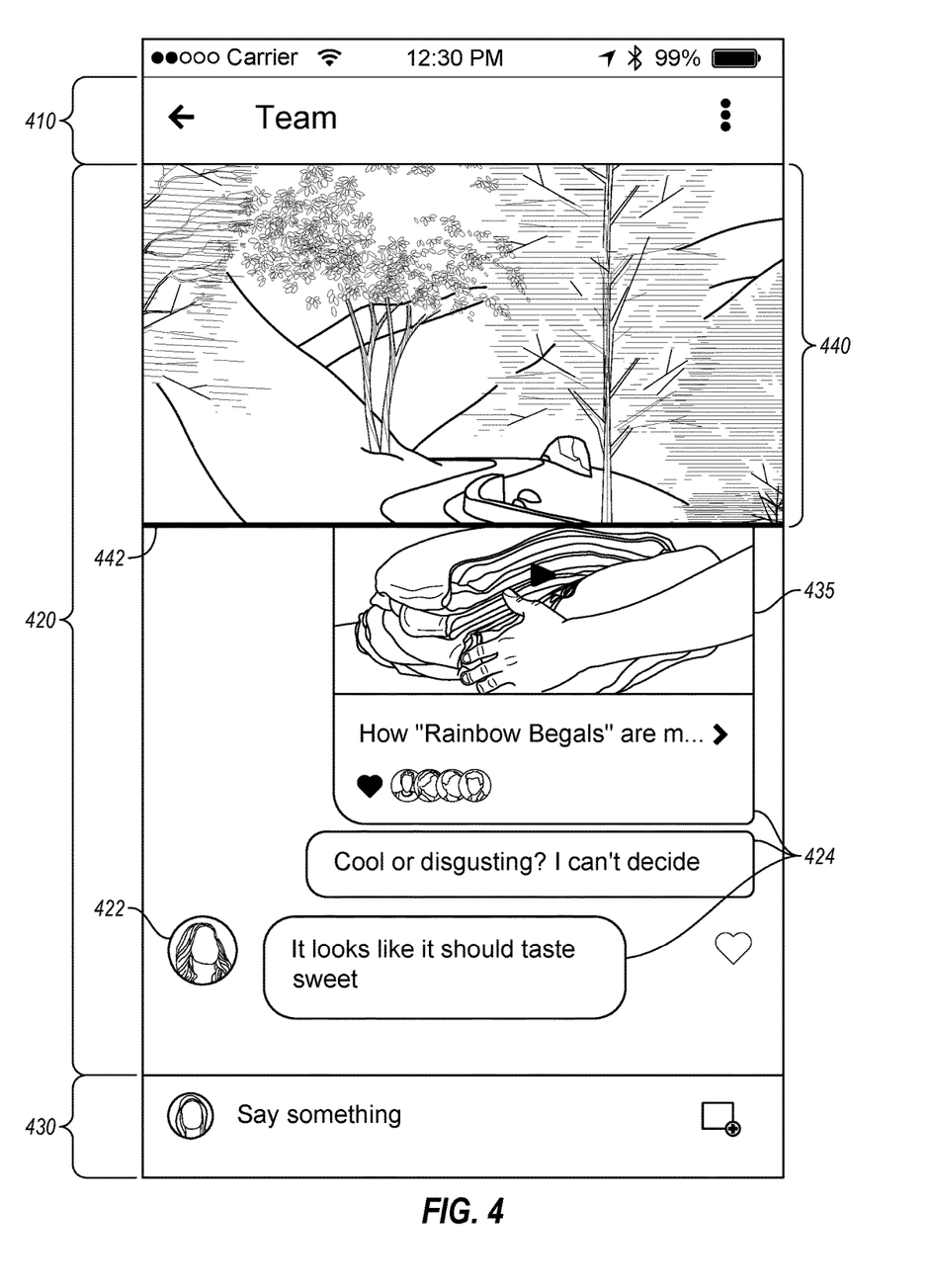
FIG. 4 illustrates an example group communication interface in which a video is shared in a persistent state, according to an implementation.

FIG. 4 illustrates an example of a group communication interface 400 in which a video is shared in a persistent state in a group communication, according to some implementations. The group communication interface 400 reflects a same example group communication depicted in group communication interfaces 200, 300 of FIGS. 2 and 3. As such, the group communication interface 400 includes a group communication ID header 410, a conversation portion 420, and a message input portion 430, which operate similar to the identically-named counterparts described with respect to group communication interfaces 200, 300 of FIGS. 2 and 3. Similar to FIGS. 2 and 3, the conversation portion 420 may include one or more messages 424 provided by one or more client devices participating in the group communication. User avatars 422 may be shown in the conversation portion 420 to identify user(s) the contributed a particular message 424 to the group communication.

In the example in FIG. 4, when the mini-player 340 of the shared video in the inline expansion state is scrolled to a top of the group communication interface 400, the shared video of FIGS. 2 and 3 is provided within the group communication interface 400 in a persistent state. As such, the shared video is maintains a position (e.g., persistent) at the top of the group communication interface 400, while the other messages 424 continue to scroll (in either direction) below the video. Although the description herein discusses the video in the persistent state provided at a top of the UI, other implementations may include the video in the persistent state in a different portion of the UI, such as the bottom or sides of the UI, for example. In some implementations, a drop-shadow 442 is shown immediately below and/or underneath the video 440 to indicate that the video is in the persistent state. Similar to the mini-player 340 of FIG. 3, the video 440 may include playback controls to control playback of the video within the group communication interface 400.

Referring back to FIG. 1, in one implementation, if the communication is scrolled such that the location of the video (as originally shared in the conversation) is scrolled back onto the UI fully, the client communication module 165 instructs the video player 180 to transition playback from the persistent state into the inline expansion state. Finally, if the video is in either the inline expansion state or the persistent state and a selection of another video (e.g., taps a thumbnail representing a second video; video 435 in group communication interface 400 of FIG. 4) shared in the group communication is detected, the server communication module 120 sends an instruction to the client communication module 165 to collapse the existing playback of the first video and begin playback of the second video (e.g., in an inline expansion state as described above).

As shown in FIGS. 2, 3, and 4, aspects of the disclosure provide a mechanism for video playback in group communications. The aspects of the disclosure can be implemented within a native group communication (e.g., group chat) component of an application such as the content sharing application 160, a social networking application, etc. Alternatively, the aspects of the disclosure can be implemented within an independent group communication (e.g., group chat) application.

In one implementation, the server communication module 125 provides the group communication for display on the client device 150 and monitors permission settings for each member of the group communication. For example, assume that a user of the content sharing service 100 caused a video to be uploaded to the content sharing service 100 and set privacy settings for the video to limit access to the uploaded video to other users of the content sharing service 100 who are connected to the posting user. If the posting user or another user connected to the posting user shared the video to a group communication, members of the group communication who are not connected to the posting user may not be able to view the video. In one embodiment, permission settings for users of the content sharing service 100 are stored in the user database 140.

The video database 130 stores video files and associated metadata provided by content owners. Each uploaded video is assigned a video identifier (ID) when it is processed. In addition to the video ID, the video files have associated metadata such as artist, video title, label, genre, time length, and geo-restrictions that can be used for data collection or content blocking on a geographic basis. More or fewer items of metadata can be associated with video files at the discretion of the implementer. In some embodiments, the video database 130 also stores identifiers of suggested or trending videos, as determined by the content sharing service 100.

The user database 140 maintains a record of registered users of the content sharing service 100. Registered users include content providers and/or users that consume (e.g., play) and interact (e.g., share, rate, comment, etc.) with videos on the content sharing service 100, rather than upload videos to the content sharing service 100. A user can register account and/or credential information, including, for example, login name, e-mail address, and password with the content sharing service 100. This account and/or credential information is stored in the user database 140.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 5:
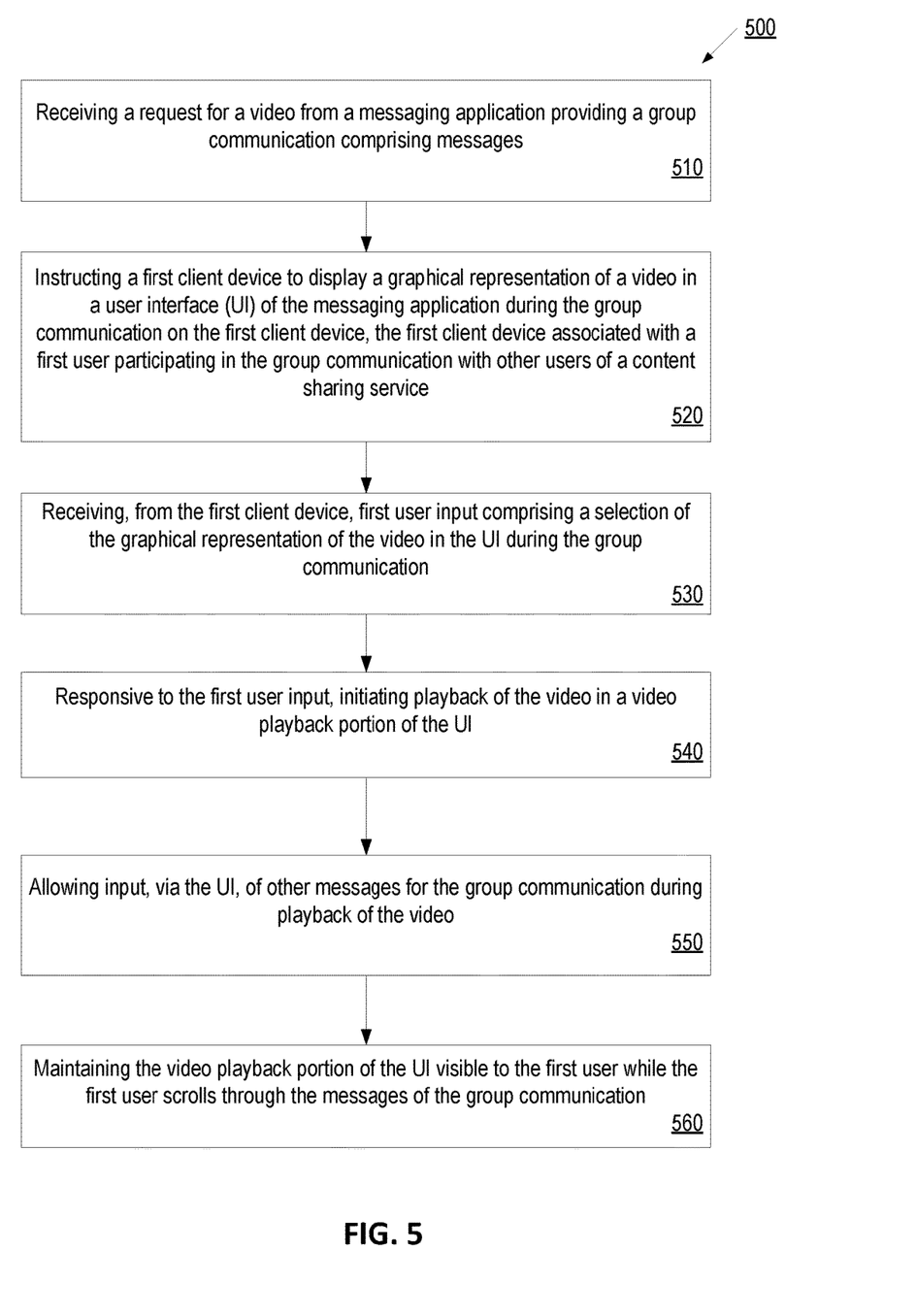
FIG. 5 is a flow diagram of an example server-side method for video playback, in accordance with some implementations of the disclosure.

FIG. 5 is a flow diagram of an example server-side method 500 for video playback in group communication, in accordance with some implementations of the disclosure. Method 500 and each of its individual functions, routines, subroutines, or operations may be performed by one or more processing devices of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by content sharing service 100 executed by one or more processing devices of the server(s) 110.

Method 500 may begin at block 510 when a processing device receives a request for a video from a messaging application providing a group communication comprising messages. At block 520, the processing device instructs a first client device to display a graphical representation of a video in a user interface (UI) of the messaging application during the group communication on the first client device. In one implementation, the first client device associated with a first user participating in the group communication with other users of a content sharing service. The graphical representation may include a thumbnail image. In some implementations, displaying the graphical representation of the video is referred to as the collapsed state described above.

Subsequently, at block 530, the processing device receives, from the first client device, first user input comprising a selection of the graphical representation of the video in the UI during the group communication. Then, at block 540, the processing device, responsive to the first user input, initiates playback of the video in a video playback portion of the UI. In some implementations, this is referred to as the inline expansion state described above.

At block 550, the processing device allows input, via the UI, of other messages for the group communication during playback of the video. Lastly, at block 560, the processing device maintains the playback portion of the UI visible to the first user while the first user scrolls through the messages of the group communication. During the inline expansion state described above, the video playback portion scrolls with the messages in the UI. During the persistent state described above, the video playback portion persists separately from scrolling of the messages in the UI.

Figure 6:
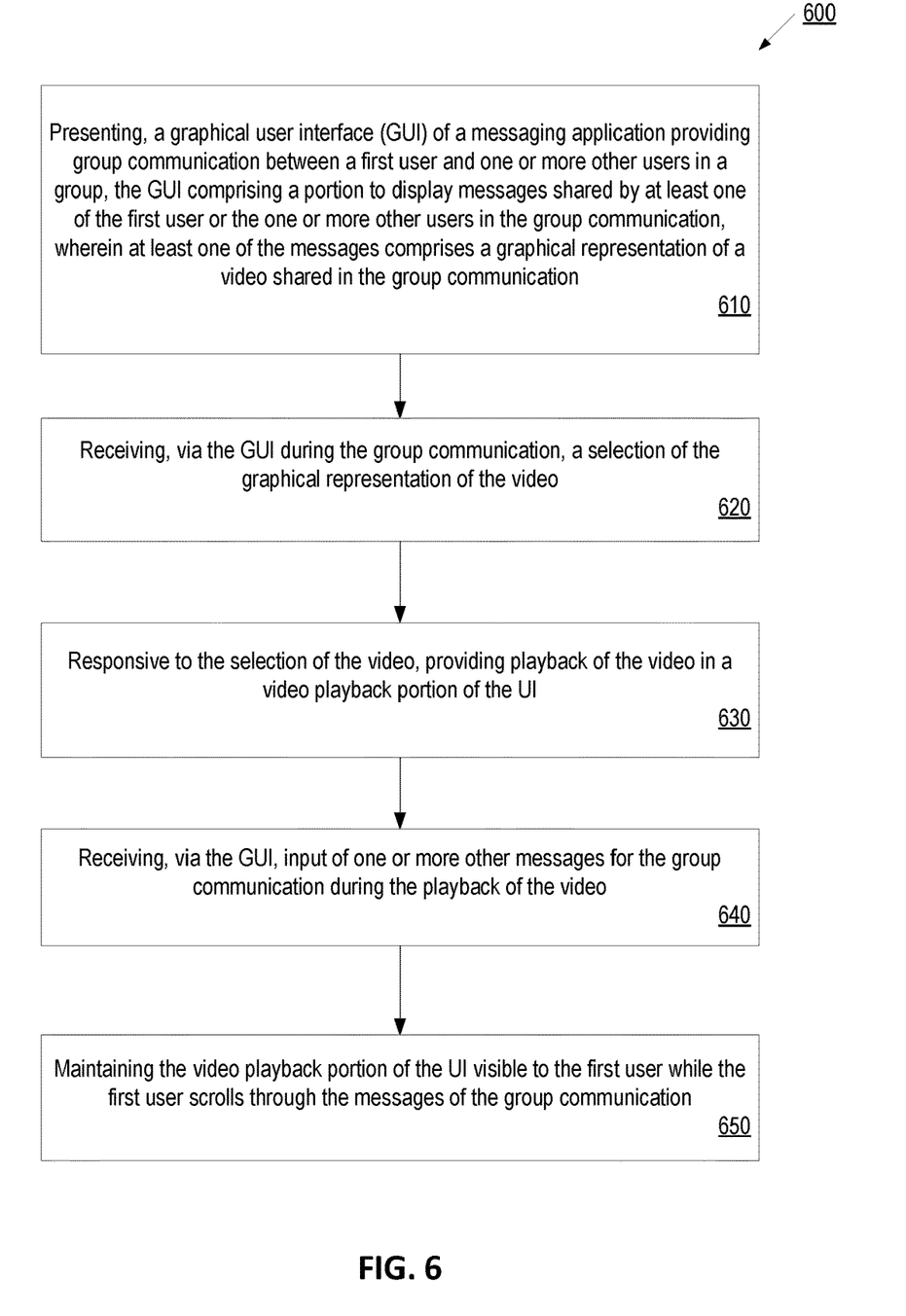
FIG. 6 is a flow diagram of an example client-side method for video playback, in accordance with some implementations of the disclosure.

FIG. 6 is a flow diagram of an example client-side method 600 for video playback in group communications, in accordance with some implementations of the disclosure. Method 600 and each of its individual functions, routines, subroutines, or operations may be performed by one or more processing devices of the computer device executing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processes implementing method 600 may be executed asynchronously with respect to each other. In one implementation, method 600 may be performed by application 160 executed by one or more processing devices of a mobile device (client device 150).

Method 600 may begin at block 610 by a processing device presenting, a graphical user interface (GUI) of a messaging application providing group communication between a first user and one or more other users in a group. In one implementation, the GUI includes a portion to display messages shared by at least one of the first user or the one or more other users in the group communication. The at least one of the messages may include a graphical representation of a video shared in the group communication. In one implementation, displaying the graphical representation of the video is referred to as the collapsed state described above.

At block 620, the processing device may receive, via the GUI during the group communication, a selection of the graphical representation of the video. Then, at block 630, the processing device may, responsive to the selection of the video, provide playback of the video in a video playback portion of the UI. In some implementations, this is referred to as the inline expansion state described above.

Subsequently, at block 640, the processing device may receive, via the GUI, input of one or more other messages for the group communication during the playback of the video. Lastly, at block 650, the processing device may maintain the video playback portion of the UI visible to the first user while the first user scrolls through the messages of the group communication. During the inline expansion state described above, the video playback portion scrolls with the messages in the UI. During the persistent state described above, the video playback portion persists separately from scrolling of the messages in the UI.

Figure 7:
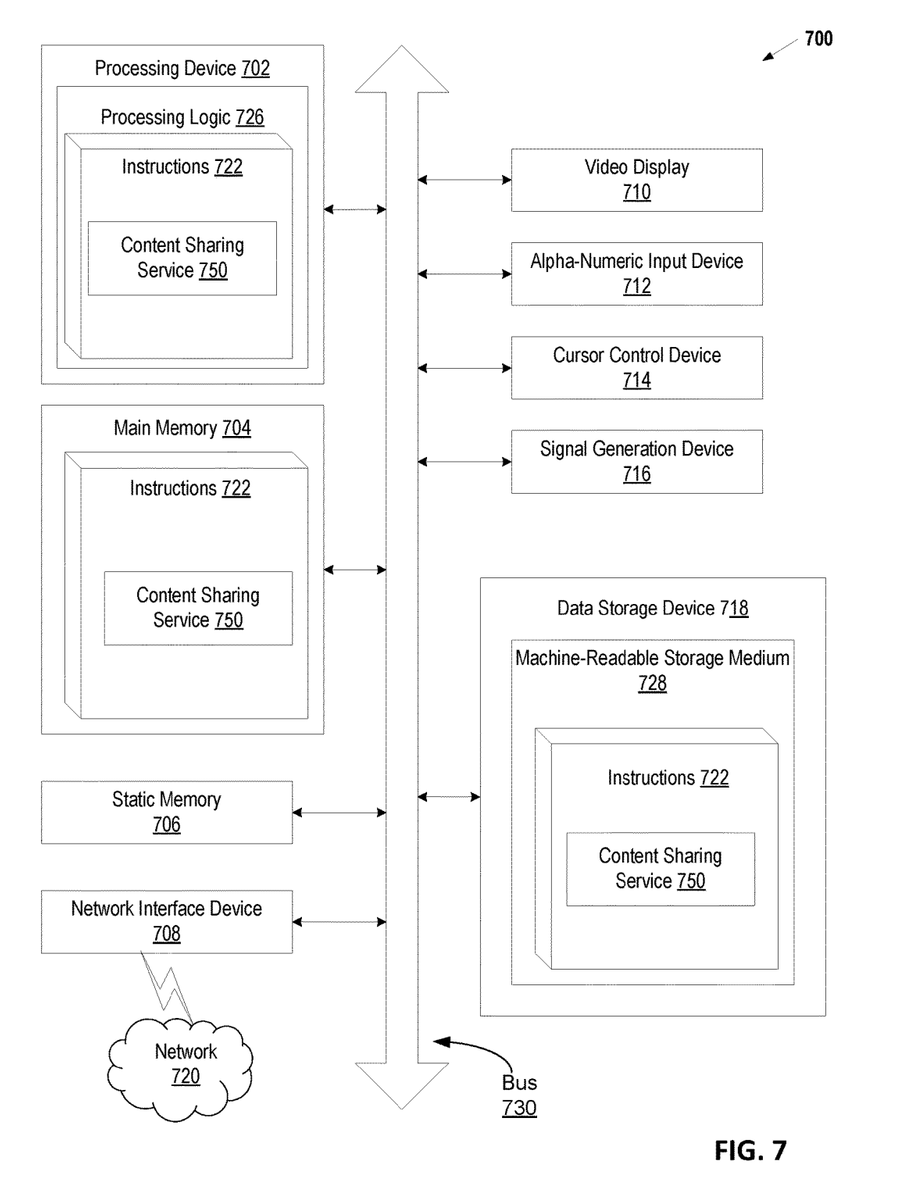
FIG. 7 is a block diagram illustrating an example computer usable to implement entities of the video-sharing environment, according to an implementation.

The client 150 and the content sharing service 100 are each implemented using computers. FIG. 7 is a block diagram illustrating an example computer 700 usable to implement entities of the video-sharing environment, in accordance with one embodiment. The example computer 700 has sufficient memory, processing capability, network connectivity bandwidth, and other computing resources to implement video playback in a group communication as described herein.

The computer 700 includes at least one processor 702 (e.g., a central processing unit, a graphics processing unit) coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, a keyboard 710, a pointing device 714, and a network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), digital versatile disc (DVD), or a solid-state memory device. The memory 706 holds instructions and data used by the processor 702. The processor 702 can include one or more processors 702 having one or more cores that execute instructions. The pointing device 714 is a mouse, touch-sensitive screen, or other type of pointing device, and in some instances is used in combination with the keyboard 710 to input data into the computer 700. The graphics adapter 712 displays media and other images and information on the display 718. The network adapter 716 couples the computer 700 to one or more computer networks (e.g., the network 105).

The computer 700 is adapted to execute computer program modules for providing the functionality described herein including presenting media and/or metadata generation. As used herein, the term "module" refers to computer program logic used to provide the specified functionality. Thus, a module can be implemented in hardware, firmware, and/or software. In one embodiment of a computer 700 that implements the content sharing service 100 (illustrated as content sharing servicer 750) including program modules such as the video service module 115, the video selection module 120, and the server communication module 125 are stored on the storage device 708, loaded into the memory 706, and executed by the processor 702.

The types of computers 700 used by the entities of the video-sharing environment can vary depending on the embodiment and the processing power required by the entity. For example, the client 150 is a smart phone, tablet, laptop, or desktop computer. As another example, the content sharing service 100 might comprise multiple blade servers working together to provide the functionality described herein. The computers 700 can contain duplicates of some components or can lack some of the components described above (e.g., a keyboard 710, a graphics adapter 712, a pointing device 714, and a display 718). For example, the content sharing service 100 can run in a single computer 700 or multiple computers 700 communicating with each other through a network such as a server farm.

Aspects of the disclosure have been described in particular detail with respect to various embodiments, and those of skill in the art will appreciate that the disclosure can be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms to implement the disclosure or its features can have different names, formats, or protocols. Second, the system can be implemented via a combination of hardware and software, as described, or entirely in hardware elements. Third, the particular division of functionality between the various system components described herein is merely exemplary, and not mandatory; functions performed by a single system component can instead by performed by multiple components, and functions performed by multiple components can instead be performed by a single component.

Some portions of this description describe the aspects of the disclosure in terms of algorithms and symbolic representations of operations on information. These algorithmic descriptions and representations are commonly used by those skilled in the art to convey the substance of their work effectively to others skilled in the art. These operations while described functionally computationally or logically are understood to be implemented by computer programs or equivalent electrical circuits microcode or the like. Furthermore it has also proven convenient at times to refer to these arrangements of operations as modules without loss of generality. The described operations and their associated modules can be embodied in software stored on a non-transitory computer-readable medium that cause a processor to execute described functions; or in firmware; or hardware; or any combinations thereof.

Embodiments can also relate to an apparatus for performing the operations herein. This apparatus can be specially constructed for the required purposes and/or it can comprise a general-purpose computing device selectively activated or reconfigured by a computer program stored in the computer. As noted, such a computer program can be stored in a non-transitory tangible computer readable storage medium or any type of media suitable for storing electronic instructions which can be coupled to a computer system bus. Furthermore any computing systems referred to in the specification can include a single processor or can be architectures employing multiple processor designs for increased computing capability. A general-purpose computer programmed as described above thereby becomes a special-purpose computer, adapted to perform the functions described here.

Aspects of the disclosure can also relate to a product that is produced by a computing process described herein. Such a product can comprise information resulting from a computing process where the information is stored on a non-transitory tangible computer readable storage medium and can include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description but rather by any claims that issue on an application based hereon.

What is claimed is:

1. A computer-implemented method comprising:
   receiving a request for a video from a messaging application providing a group communication comprising messages;
   instructing a first client device to display a graphical representation of the video in a user interface (UI) of the messaging application during the group communication on the first client device, the first client device associated with a first user participating in the group communication with other users of a content sharing service, the graphical representation to scroll with the messages of the group communication;
   receiving, from the first client device, first user input comprising a selection of the graphical representation of the video in the UI during the group communication;
   responsive to the first user input, initiating playback of the video in a video playback portion of the UI, the video playback portion to scroll with the messages of the group communication;
   allowing input, via the UI, of other messages for the group communication during playback of the video; and
   responsive to detecting that the video playback portion is scrolled at least partially out of view of the UI in response to the input of the other messages, maintaining the video playback portion of the UI visible to the first user in a persistent position in the UI while the the messages are scrolled within the group communication separate from the video playback portion in the persistent position.

2. The computer-implemented method of claim 1 wherein the first user input comprises a tap gesture detected with respect to the video in the UI of the group communication.

3. The computer-implemented method of claim 1, wherein at least one of a vertical swipe up gesture or a vertical swipe down gesture detected with respect to the UI during the group communication is to cause the video playback portion and the messages to scroll together.

4. The computer-implemented method of claim 3, further comprising, responsive to the vertical swipe down gesture causing the video playback portion to be scrolled out of view at a bottom of the UI of the group communication, stopping playback of the video.

5. The computer-implemented method of claim 1, further comprising:
   receiving a third user input comprising a tap gesture with respect to the video playback portion; and
   responsive to the third user input, instructing the first client device to display the graphical representation of the video in the UI.

6. The computer-implemented method of claim 1, further comprising
   receiving a third user input comprising a selection of a collapse control of the video; and
   responsive to the third user input, instructing the first client device to display the graphical representation of the video.

7. The computer-implemented method of claim 1, wherein the video playback portion comprises playback controls to allow playback of the video to be paused while keeping the video in the playback portion of the UI.

8. The computer-implemented method of claim 1, wherein at least one of a vertical swipe up gesture or a vertical swipe down gesture detected with respect to the persistent position of the video playback portion of the UI causes the messages to scroll while the video playback portion maintains the persistent position in the UI.

9. The computer-implemented method of claim 8, further comprising, while the video is displayed in the persistent position and responsive to one of the messages comprising the video as originally shared in the group communication appearing fully in view in the UI during the group communication, instructing the first client device to display the graphical representation of the video.

10. The computer-implemented method of claim 1, wherein a drop-shadow displayed under the video playback portion in the UI during the group communication indicates that the video is displayed in the persistent position.

11. The computer-implemented method of claim 1, wherein the graphical representation of the video comprises a thumbnail image.

12. The computer-implemented method of claim 8, further comprising:
receiving a third user input comprising a swipe down gesture with respect to the video playback portion displayed in the persistent position in the UI; and
responsive to the third user input, instructing the first client device to display the graphical representation of the video.

13. The computer-implemented method of claim 1, further comprising:
receiving a third user input comprising a selection of another video in the UI of the group communication; and
responsive to the third user input:
instructing the first client device to display the graphical representation of the video; and
instructing the first client device to begin playback of the another video in the video playback portion of the UI.

14. The computer-implemented method of claim 1, wherein the persistent position comprises a top portion of the UI of the messaging application.

15. A mobile device comprising;
a memory; and
a processing device, coupled to the memory, to:
present, a graphical user interface (GUI) of a messaging application providing group communication between a first user and one or more other users in a group, the GUI comprising a portion to display messages shared by at least one of the first user or the one or more other users in the group communication, wherein at least one of the messages comprises a graphical representation of a video shared in the group communication, the graphical representation to scroll with the messages of the group communication;
receive, via the GUI during the group communication, a selection of the graphical representation of the video;
responsive to the selection of the video, provide playback of the video in a video playback portion of the UI, the video playback portion to scroll with the messages of the group communication;
receive, via the GUI, input of one or more other messages for the group communication during the playback of the video; and
responsive to detecting that the video playback portion is scrolled at least partially out of view of the UI in response to the input of the other messages, maintain the video playback portion of the UI visible to the first user in a persistent position in the UI while the messages are scrolled within the group communication separate from the video playback portion in the persistent position.

16. The mobile device of claim 15, wherein the video playback portion is to scroll together with the messages, and wherein at least one of a vertical swipe up gesture or a vertical swipe down gesture detected with respect to the UI during the group communication is to cause the video playback portion and the messages to scroll together.

17. The mobile device of claim 15, wherein at least one of a vertical swipe up gesture or a vertical swipe down gesture detected with respect to the persistent position of the video playback portion of the UI causes the messages to scroll while the video playback portion maintains the persistent position in the UI.

18. The mobile device of claim 17, further comprising, while the video is displayed in the persistent position and responsive to one of the messages comprising the video as originally shared in the group communication appearing fully in view in the UI during the group communication, instructing the first client device to display the graphical representation of the video.

19. A non-transitory computer-readable medium storing computer-executable instructions that, in response to execution, cause a device comprising a processor to perform operations, comprising:
receiving, by the processor, a request for a video from a messaging application providing a group communication comprising messages;
instructing a first client device to display a graphical representation of the video in a user interface (UI) of the messaging application during the group communication on the first client device, the first client device associated with a first user participating in the group communication with other users of a content sharing service, the graphical representation to scroll with the messages of the group communication;
receiving, from the first client device, first user input comprising a selection of the graphical representation of the video in the UI during the group communication;
responsive to the first user input, initiating playback of the video in a video playback portion of the UI, the video playback portion to scroll with the messages of the group communication;
allowing input, via the UI, of other messages for the group communication during playback of the video; and
responsive to detecting that the video playback portion is scrolled at least partially out of view of the UI in response to the input of the other messages, maintaining the video playback portion of the UI visible to the first user in a persistent position in the UI while the messages are scrolled within the group communication separate from the video playback portion in the persistent position.

20. The non-transitory computer-readable medium of claim 19, wherein the video playback portion is to scroll together with the messages, and wherein at least one of a vertical swipe up gesture or a vertical swipe down gesture detected with respect to the UI during the group communication is to cause the video playback portion and the messages to scroll together.

\* \* \* \* \*

UNITED STATES PATENT AND TRADEMARK OFFICE
CERTIFICATE OF CORRECTION

PATENT NO. : 10,511,891 B2
APPLICATION NO. : 15/717273
DATED : December 17, 2019
INVENTOR(S) : Annie Tang et al.

Page 1 of 1

It is certified that error appears in the above-identified patent and that said Letters Patent is hereby corrected as shown below:

In the Claims

In Claim 1, Column 14, Line 27, delete the last "the" in the line

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*